Patented Feb. 14, 1933

1,897,582

UNITED STATES PATENT OFFICE

JACQUE C. MORRELL AND GUSTAV EGLOFF, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

TREATMENT OF HYDROCARBON OILS

No Drawing.  Application filed January 29, 1931.  Serial No. 512,210.

This invention relates to the treatment of hydrocarbon oils, and refers more particularly to the refining of the relatively low boiling hydrocarbon distillates.

In one of its specific aspects the invention embodies a process for the refining of cracked hydrocarbon oils and comprises subjecting such oils to treatment with sulphur trioxide and steam in the presence of ferric sulphate.

The invention has especial application to the refining of the lighter hydrocarbon distillates in the vapor phase and is particularly useful in the refining in the vapor phase of the relatively low boiling products resulting from the conversion of hydrocarbon oils by subjecting the said vapors from the cracking process during or subsequent to fractionation to treatment with sulphur trioxide and steam in the presence of ferric sulphate.

The usual method of refining cracked distillates is to subject them to treatment with sulphuric acid and alkaline solutions, including plumbite solutions consisting of litharge dissolved in alkaline solutions in various combinations of treatment and subsequently to subject the acid treated product to redistillation usually in the presence of steam. The present invention permits the direct treatment of the hydrocarbon vapors from the cracking process, reducing the cost of reagents and eliminating the redistillation or rerunning operation, although it is within the scope of the invention to revaporize the product in a subsequent operation and subject the vapors to treatment as described.

In applying the process of the invention to practice any suitable equipment may be employed which will permit the contacting of the hydrocarbon vapors and the sulphur trioxide and steam with the ferric sulphate; for example, a suitable tower or chamber packed with a selected oxide may be employed following the fractionator of a cracking system.

Sulphur trioxide from any suitable source, alone or in combination with steam, may be introduced directly into the tower or treating vessel containing the ferric sulphate. In lieu of direct packing of the tower or treating vessel with the ferric sulphate an inert filling material such as Raschig rings, firebrick, crushed rock, gravel, crushed ceramic material, and the like, suitably coated with ferric sulphate, or a mixture of the same may be employed. Similarly, any device which permits the efficient contacting of the vapors undergoing treatment with ferric sulphate may be employed.

The tower or treating vessel containing the ferric sulphate may be directly connected to a cracking unit or to a rerun or redistillation unit so that the vapors arising therefrom may be treated in the manner described.

It has been found desirable to neutralize the distillate immediately after condensation either by passing the condensate directly through a body of alkaline material such as a solution of caustic soda or by washing the distillate free of acidic materials with water and/or alkalies, such as a solution of caustic soda, ammonia or the like. The neutralizing agent may also be introduced into the vapor line leading to the condenser or into the condenser itself.

The amount of sulphur trioxide employed may vary from a fraction of a pound to several pounds, based on a barrel of hydrocarbon distillate treated.

Various temperatures of treatment may be employed; for example, from 250°–600° F., more or less, and the pressures may be subatmospheric, atmospheric, or superatmospheric. While the results may vary with the temperatures employed, the pressures and temperatures are chosen so that the hydrocarbons are treated substantially in the vapor phase.

In order to reduce the intensity of the reaction the sulphur trioxide may be admixed with an inert gas such as flue gas, carbon dioxide and the like, and is preferably introduced at various points in the treating tower.

As specific examples of the operation of the process of my invention and of the results obtained, a California cracked distillate of approximately motor fuel boiling range is vaporized and subjected to treatment with sulphur trioxide and steam in the presence of ferric sulphate. The vapors are passed at a suitable rate through the tower containing the ferric sulphate and approximately two pounds per barrel of distillate of sulphur trioxide together with steam is introduced into the tower. The untreated product shows a gum content of approximately 600 mgs. per 100 ccs. and has a reddish brown color. The sulphur content is approximately 0.25. The treated product shows a gum content of approximately 25 mgs. per 100 ccs. and has a color of plus 30 on the Saybolt colorimeter scale. The sulphur content may be reduced to approximately 0.17. The gum determinations are made by the copper dish method.

When the ferric sulphate is distributed over pumice stone similar results to those just described were obtained.

A mixed Mid-Continent and West Texas cracked distillate when treated in the vapor phase with sulphur trioxide and steam employing ferric oxide as a contacting agent gives the following results: The untreated distillate shows a gum content of approximately 350 mgs. per 100 ccs. and a light amber color. The treated distillate may be reduced in gum content to approximately 30 mgs. per 100 ccs. and a color of approximately 25 on the Saybolt colorimeter scale. The sulphur content may be reduced also.

The above examples are only illustrative and should not be construed as restrictions or limitations on the broad scope of the invention.

The treatment herein described may constitute the sole refining action on the oil, or it may constitute one step in a series of refining steps. It may be preceded by the usual treatments with refining agents such as sulphuric acid, caustic soda, plumbite, filtering earth or the like, and may be succeeded by any combination of the above refining agents, followed, if desired, by distillation.

We claim as our invention:

1. A step in a process of refining the normally liquid overhead product resulting from the cracking of petroleum oil, which comprises subjecting said product in heated vaporous condition to treatment with sulphur trioxide and steam in the presence of ferric sulphate.

2. A process for refining cracked hydrocarbon distillate of motor fuel boiling range which comprises treating the distillate in vapor form with sulphur trioxide and steam in the presence of ferric sulphate.

JACQUE C. MORRELL.
GUSTAV EGLOFF.